United States Patent [19]
Brunnett et al.

[11] Patent Number: 5,159,551
[45] Date of Patent: Oct. 27, 1992

[54] PRISM ARCHITECTURE FOR CT SCANNER IMAGE RECONSTRUCTION

[75] Inventors: Carl J. Brunnett, Willoughby Hills; Beverly M. Gocal, Richmond Hts., both of Ohio; Michael M. Kerber, Lisle, Ill.; James M. Pexa, Cleveland Hts.; Chris J. Vrettos, Willoughby, both of Ohio

[73] Assignee: Picker International, Inc., Highland Hts., Ohio

[21] Appl. No.: 391,425

[22] Filed: Aug. 9, 1989

[51] Int. Cl.$^5$ .............................................. G06F 15/42
[52] U.S. Cl. ........................... 364/413.13; 364/413.19
[58] Field of Search ............. 364/200, 413.13, 413.14, 364/413.19, 413.21, 228, 240.1

[56] References Cited

U.S. PATENT DOCUMENTS

| | | | |
|---|---|---|---|
| 4,564,900 | 1/1986 | Smitt | 364/200 |
| 4,672,535 | 1/1987 | Katzman et al. | 364/200 |
| 4,707,822 | 11/1987 | Hopkinson et al. | 364/413.21 |
| 4,777,595 | 10/1988 | Steckel et al. | 364/200 |
| 4,817,091 | 3/1989 | Katzman et al. | 371/9 |
| 4,956,772 | 9/1990 | Neeches | 364/200 |

FOREIGN PATENT DOCUMENTS

| | | |
|---|---|---|
| 0154429A2 | 9/1985 | European Pat. Off. . |
| 0188828A3 | 7/1986 | European Pat. Off. . |
| 0306305A2 | 3/1989 | European Pat. Off. . |
| 2137847A | 10/1984 | United Kingdom . |

*Primary Examiner*—Robert Weinhardt
*Assistant Examiner*—Laura Brutman
*Attorney, Agent, or Firm*—Fay, Sharpe, Beall, Fagan, Minnich & McKee

[57] ABSTRACT

An imaging system acquires imaged data from a non-invasive examination of the subject. The data is transferred among various image processing agents on a data bus. A data acquisition agent receives the image data from the non-invasive examination and generates subsequent agent locations and transmits the subsequent agent locations and the packets of image data along the data bus. Various image processing agents each receive packets of data transmitted with that agent's location and performs imaging and processing operations on the data packets generating another agent location and thereafter transmitting the other agent location and process data packets along the data bus. The display agent receives the processed image data packets from one of the image processing agents via the data bus, stores the processed image data packets and communicates the process image data to a man-readable image display.

18 Claims, 4 Drawing Sheets

PRISM ARCHITECTURE FOR CT SCANNER IMAGE RECONSTRUCTION

BACKGROUND OF THE INVENTION

The present invention relates to the transfer of image data from one reconstruction agent to another. The invention finds particular application in conjunction with tomographic (CT) scanners and will be described with particular reference thereto. However, it is to be appreciated that the invention is also applicable to other types of diagnostic imaging, image reconstruction, image and data processing, and the like.

In the field of computerized tomographic scanners, the accurate and rapid reconstruction of images is of utmost importance. One of the major drawbacks in accurate image reconstruction has been the amount of time necessary to complete the image reconstructions for each scan of a multiscan procedure. The image from one scan is substantially completed before the next scan is initiated. The longer the time necessary to complete the image and initiate the next scan of the procedure, the more likely procedure degrading occurrences, such as patient movement, become.

Increasing the speed at which acquired data is reconstructed results in a corresponding increase in image quality. The speed at which an image is reconstructed is dependent upon the time necessary to pass data among the various reconstruction agents. The speed of this reconstruction is directly related to the accessibility of data required by an agent stored in a memory location.

At present, computer tomographic and nuclear magnetic resonance reconstruction systems employ a global memory architecture, as represented in U.S. Pat. No. 4,654,797 to Fujita, et al. In a global memory architecture, all data is located in a main memory. The various agents must gain access to the main memory to acquire data for the performance of its operations and to return the partially processed data. The moving of data into and out of the global memory by many agents causes congestion and limits processing speed. The various components that perform out of global memory operations, access the global memory by first specifying an address and then either reading or writing data to that specific address.

All communication between the various agents or components necessary in the reconstruction process is done through accessing of the main memory. Therefore, the speed at which the individual agents or components can function is bound to the speed of the main memory. Additionally, although some special actions in the reconstruction process can be performed concurrently there is a hierarchy or priority of performance of the agents 'or the components' functions.

While the processing agents may be capable of processing independently, all memory access to acquire data must be outputted serially from the main memory. Thus, some agents must at times sit idle and wait for data while other agents are accessing memory.

The global memory architecture presently used in computed tomographic and nuclear magnetic resonance imaging creates a back-up or bottle-neck of agents or components wishing to access the main memory. Implementation of a hierarchial system for access to main memory among the various reconstruction agents implies a slow down in the ability of the various agents to acquire the necessary data to perform their required function.

In accordance with the present invention, an architecture which allows the various agents or components faster access to data is provided.

SUMMARY OF THE INVENTION

In accordance with one aspect of the present invention, a device is provided for the reconstruction of a computerized tomographic image. A source of penetrating radiation impinges upon an array of detectors arranged for detecting radiation that has traversed selected image regions. A data acquisition agent receives the data from the detector array and generates a preprocessing agent location message and transmits packets of detector array data which include the preprocessing agent location on a data bus. A preprocessing agent which has received from the bus data packets including the preprocessing agent location, processes and stores the received data, generates a view processing agent location message, and transmits packets of preprocessed data that include the view processing agent location on the bus.

A view processing agent receives from the bus data packets which include the view processing agent location. It performs various calibration and correction processes, and convolves and stores the received data, generates a backprojector agent location message, and transmits packets of image data that include the backprojector location on the bus. A backprojector agent receives from the bus data packets, including the backprojector agent location and backprojects the received data, generates at least a display agent location message, and transmits packets of image data that include the display agent location on the bus. A display agent which receives data packets from the bus that include the display agent location, stores and communicates the data to a man-readable display means or video monitor. The backprojector agent also generates an archiving agent location message, and transmits packets of image data that include the archiving agent location on the bus. Finally, an archiving agent receives data packets from the bus including the archiving agent location on the bus and thereafter archives the data.

In accordance with another aspect of the present invention, a data processing image reconstruction system is provided. A data bus for the transfer of image data in the form of data packets is provided. Agents used for the reconstruction or processing of image data are associated with the data bus. Each of the agents used for the processing of data contain an interface for communication between the agent and the data bus. Each agent also has a microprocessor for the processing of data accepted into the agent through the interface, and memory for storage of data accepted into the agent by the interface and for storage of data processed by the microprocessor.

One advantage of the present invention resides in its speed. The preferred embodiment allows the transfer of data between the agents at a speed of 40 megabytes per second on the data bus.

Another advantage of the present invention resides in the ability of each agent to have immediate access to required data found in memory locations. The preferred embodiment has memory locations associated with each of the reconstruction agents.

Another advantage of the present invention is that it provides flexibility of growth to the system. The present invention is constructed to allow additional reconstruction agents to be added, thereby upgrading the entire system.

Yet another advantage of the present invention resides in the interchangeability of location of the various agents. By distinction, the prior art required, due to the hard wiring of interrupts and other message paths from board to board, that the reconstruction agents maintain specific physical locations in the system.

Still further advantages of the present invention will become apparent to those of ordinary skill in the art upon reading and understanding the detailed description of the preferred embodiment.

BRIEF DESCRIPTION OF THE DRAWINGS

The invention may take form in various parts and arrangements of parts and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
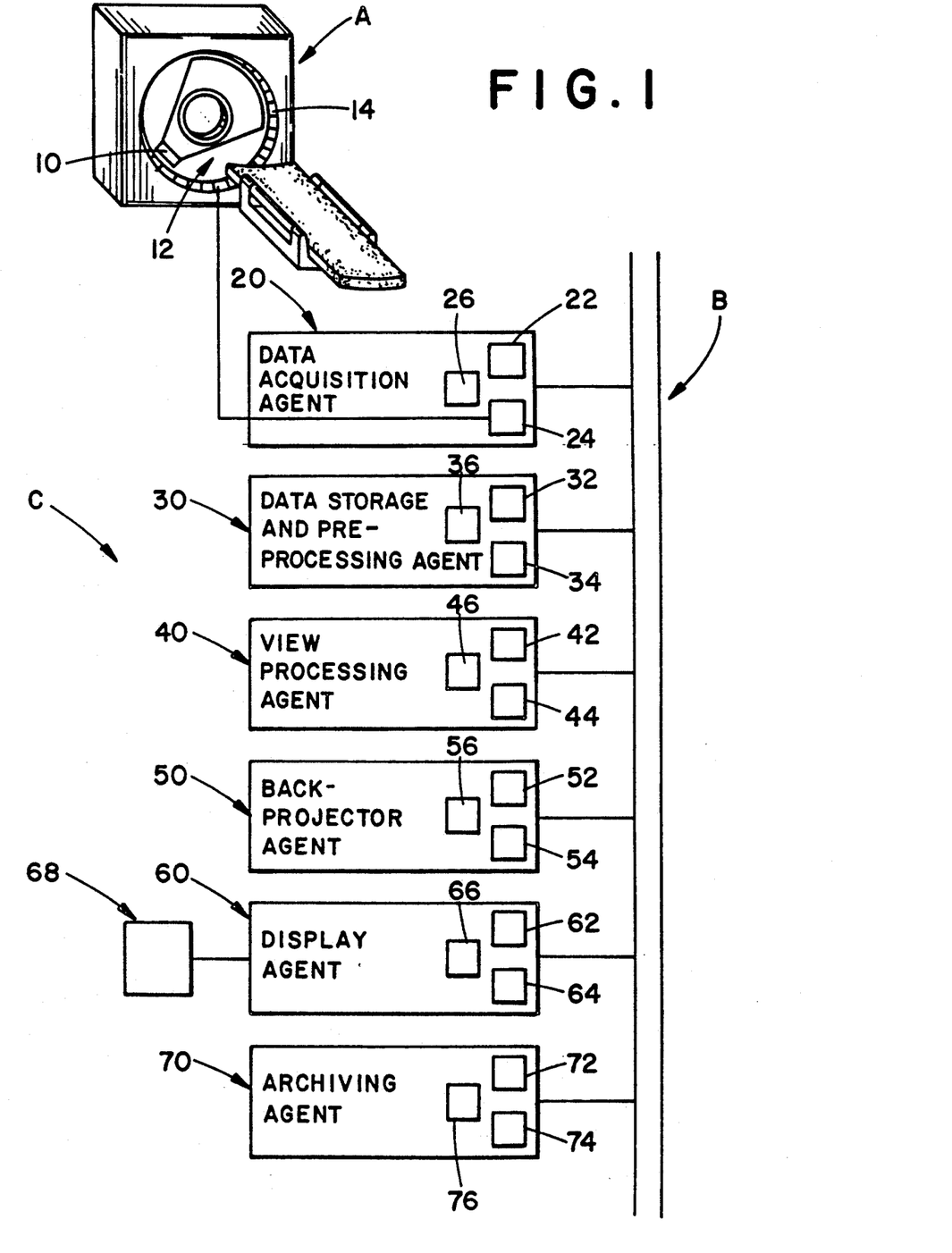
FIG. 1 is a diagrammatic illustration of a computerized tomographic scanner in accordance with the present invention.

With reference to FIG. 1, an image data generating means A, such as a magnetic resonance or CT scanner, non-invasively examines a subject and generates image data in accordance with the examination. In an illustrated CT embodiment, the scanner includes an x-ray source 10 that projects a fan beam of radiation across an examination region 12. A detector array 14 receives radiation that has traversed the examination region and a portion of the subject therein as the fan beam is rotated therearound. Electronic data signals indicative of radiation absorptive or transmissive properties of the subject in the examination region are generated by the detector array and associated circuitry.

A data bus B transfers packets of data from the image data generating means among a plurality of data processing agents C. A first or data acquisition agent 20 comprised of an interface 22, a FIFO memory 24, and a microprocessor 26, acquires data generated by the image data generating means A. The interface 22 organizes the data acquired from the detector array 14 now stored in its memory FIFO 24 into small data packets approximately 32 bytes in size.

These data packets are transferred via the data C bus B to a second or preprocessing agent 30. The preprocessing agent has an interface 32 which inputs the data packet into the preprocessing agent 30. The data packets entering the system through the interface 32 are stored in a preprocessing agent memory 34 until a preprocessing agent's microprocessor 36 requests data stored in the memory. While in the preprocessing agent 30, the data acquired is rearranged and other corrections or adjustments are made by the preprocessing microprocessor 36. Upon request from a third or view processing agent 40, the preprocessed data stored in preprocessing memory 34 is pulled out and organized into small data packets by the interface 32. Each of the data packets is merged with a location message directing the data packet to the view processing agent 40 to form a message that is transferred along the data bus to the view processing agent 40.

Upon arriving at the view processing agent 40, the data packet is entered into the agent from data bus B through a view processing agent's interface 42. The data is entered to and remains in a view processing agent's memory 44 until retrieved by a view processing agent's microprocessor 46. While in the view processing agent 40, the microprocessor convolves sets of the data with convolution functions further manipulating and processing it into proper form for backprojecting. This reconstruction technique is further described in U.S. Patent application Ser. No. 276,143, filed Nov. 25, 1988.

This image data, which again has been stored in view processing memory 44, is transmitted out of the view processing agent 40 in data packets after a request from a fourth or backprojector agent 50. The requested data packets enter the backprojector agent 50 through a backprojector agent interface 52 and are stored in a backprojector agent memory 54. A backprojector agent microprocessor 56 backprojects the image data sets.

Upon a request from a fifth or display agent 60, the backprojector agent 50 forms data packets including the display agent location and transmits the data packets onto the data bus via the backprojector agent's interface 52. The display agent receives these data packets via a display interface 62, stores them in a display memory 64. A display agent's microprocessor 66 selectively retrieves image data from the display memory 66 on a video monitor 68 or other type of display means.

The image, which is reconstructed and displayed by the display agent 60, is archived by a sixth or archiving agent 70. The archiving agent 70 receives the data in a manner similar to that previously discussed. Specifically, through the interface 72 after which it is stored in its memory 74 until need by its microprocessor 76.

Data originally derived by the detector array 14 and then acquired by the data acquisition agent 20 is organized into packets of data to be placed on the data bus B which operates at a speed of 40 megabyte per second. Communication between the data bus B and the agents C occurs through interfaces 22, 32, 42, 52, 62, 72. For example, data from the agents C, stored in the agents' memories 24, 34, 44, 54, 64, 74, after having been processed by the microprocessor 26, 36, 46, 56, 66, 76, are transferred out to the data bus B through the interfaces 22, 32, 42, 52, 62, 72.

Upon receiving a request for data, an agent C transfers the requested block of data. The agent transfers the requested block of data in small data packets until the entire block of data is transferred. The sending circuitry transfers the data in packets of data each of which contain the identification (ID) of the sending agent and the ID and location of the receiving agent. The receiving circuitry of interfaces 22, 32, 42, 52, 62, 72 collects only data packets with its ID.

The interfaces 22, 32, 42, 52, 62, 72 send small packets, 32 bytes per packet, one at a time on to the data bus. Transferring the data in such a manner, the data packets are interleaved on the data bus with data packets from other agents. For example, a data packet from the view processing agent 40 can be followed by a data packet from the data acquisition agent 20, which can in turn be followed by a packet by the backprojector agent 50.

The data acquisition agent 20 receives blocks of data from the CT gantry A and divides it into data packets. The data acquisition agent 20 also generates a preprocessing agent location message, this and other location messages actually being fields within appropriate data packets, which is transmitted with the data packet onto the data bus. The location message tells the data packet its destination once it is on the data bus B.

In the preferred embodiment, one agent communicates with another agent, not by addressing the memory in the other agent, but merely by sending what is called a location message. As stated above, the location message is actually a field within the data packet The location message directs the data to a particular agent, e.g. from the data acquisition agent 20 to the data storage and preprocessing agent 30. The message does not specify specifically what is to occur to the data when it arrives at its destination. It is up to the receiving agent to decide, through the use of its individual computing ability, what to do with the data and to manage its own memory. Therefore, transfers of data packets are not from memory location to memory location within a global memory as they are in a conventional global system but are rather from agent to agent. A key point of the present embodiment is that since each of the agents is, in fact, a computer with decision making capabilities, the data packets are coming into each agent autonomously. The packets are not targeted for a particular address as is done in a conventional system. Having agents which are in essence computers allows a data packet to be sent to an agent and then the software, resident in the receiving agent, decides where to put the data and how it is to be used.

Each packet is identified as to where the packet is to go and as to what type of data (i.e. scan data, image data, calibration data) it is.

When the preprocessing agent 30 receives a data packet from the data bus B, the packet includes the preprocessing agent's location. Thereafter, the preprocessing agent 30 processes and stores the received data. Upon receiving a request, the preprocessing agent 30 generates a data package having a view processing agent location message in the packet and thereafter transmits packets of data on to the data bus B via its interface 32. The data packet from the preprocessing agent 30 travels along the data bus B interleaved with data packets from other agents until it reaches the location designated by the location message included in its data packet. In this case, it is received by the view processing agent 40 through the view processing agent's interface 42. The view processing agent 40 processes the data received and thereafter stores the received data in its memory 44. Upon receiving a request, the view processing agent 40 transfers data packets in a similar manner to that discussed above. In the present embodiment these packets are delivered to the backprojector agent 50.

The backprojector agent 50, upon receiving a request for data produces data packets, from a larger data block, which includes a location message for the destination of the data packets, in this instance a display agent location message. The backprojector agent 50 puts these data packets onto the data bus B through its interface 52. The data packets travel on the data bus B at 40 megabytes per second until each reaches its destination designated by the display agent location message of the data packet.

Upon receiving the data packets from the backprojector agent 50, the display agent 60 stores the data in its memory 64 and communicates the data to a man-readable display, e.g. a video monitor. Upon receiving a request from the archiving agent 70, the backprojector agent 50 passes along the requested data in data packets similar to the previous described methods.

Figure 2:
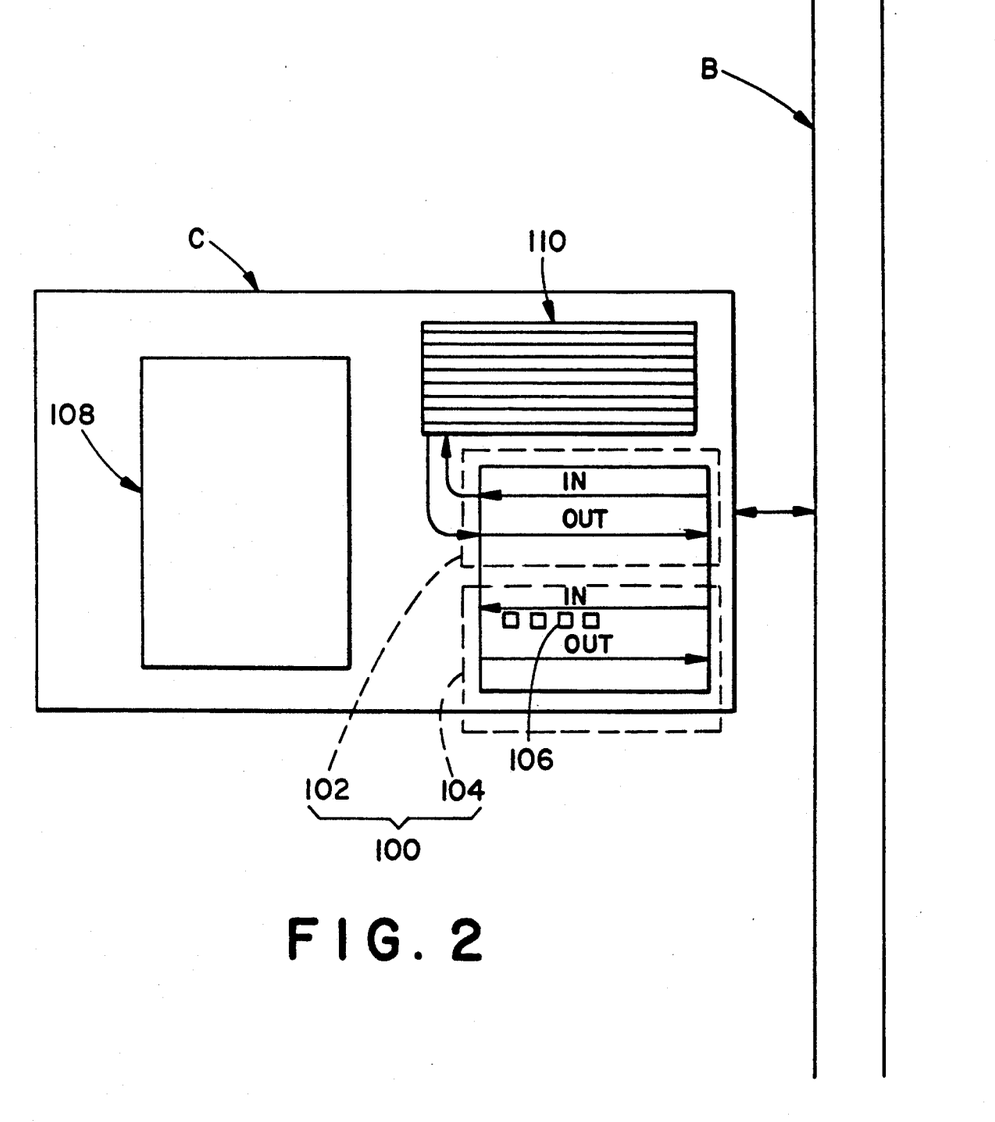
FIG. 2 is a more detailed illustration of the components which are common to the various agents.

With reference to FIG. 2, interface 100 which represents the configuration of interfaces 22, 32, 42, 52, 62, 72 of FIG. 1, each contain a direct memory access register 102 which transfers large blocks of data between agents. Transfer of the large block of data is accomplished through the direct memory access register 102, after the data has been organized into smaller data packets. A transfer initiated by the direct memory access register takes the data directly from memory into direct memory access circuitry and thereafter directly out onto the bus. This direct memory access register 102 is initiated for data exiting an agent and for data entering an agent.

The interface also has a standard register 104 for inputting and outputting data. Both registers in interface 100 are designed to be active at the same time.

The standard register 104 is arranged in a pipeline fashion wherein several messages can be stacked succeedingly in the register. The messages are read one word at a time, enabling software to perform a read out of register 104. This type of message is an unrequested message or an "intelligent interrupt" and can arrive at any time. The receiving circuitry transfers this type of unrequested data packet into a FIFO buffer 106 where it resides until the microprocessor 108 reads the message.

The direct memory access register 102 is activated when information is requested. During a requested exchange, information is written to the direct memory access register 102 and this information moves directly into an agents C memory 110. This information is written in the form of data packets which have been previously discussed. The advantage of the direct memory register is that the bus operates at 40 megabytes per second. Because the direct memory access register 102 outputs the data directly to the bus, the data travels at this faster speed. This is in contrast to two agents directly hooked together with the transfer moving at the slowest speed between the two agents, a transfer speed being based on the speed of the main memory. The direct memory register 102 allows the movement of messages directly from the bus into one of the local agents memories 24, 34, 44, 54, 64, 74.

In normal operation, data entering the interface 100 is directed into memory 110. The data is removed from the agent memory and processed by the microprocessor 108 in accordance with the preprogrammed data processing operation or function of the agent. Other data, which is passed on the data bus, is logic-type information used to synchronize the flow of data through the system, or data which states that the system is ready for operation. These types of data contain information that does not end up stored in the agent's memory and may never actually leave the interface 100.

Figure 3:
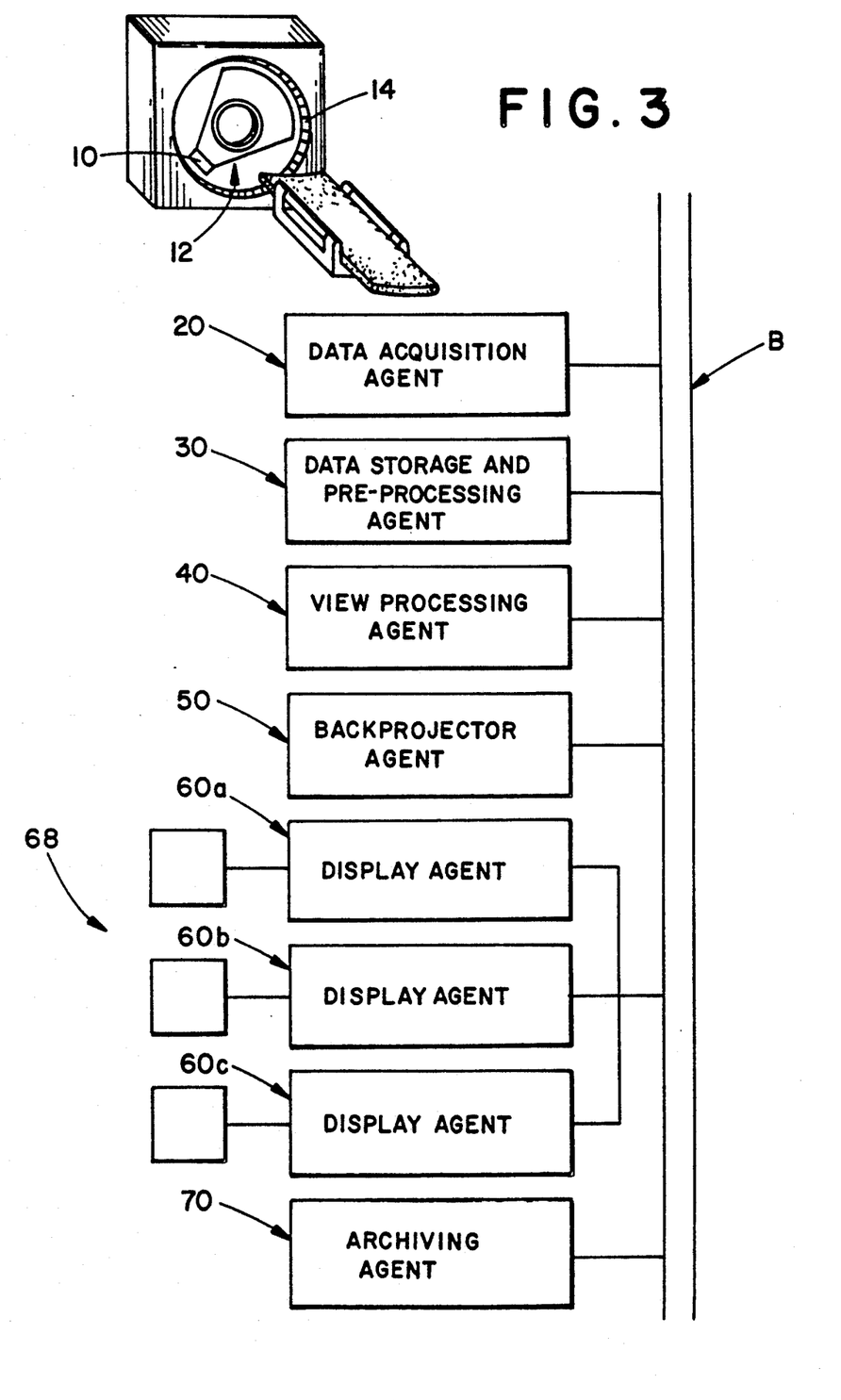
FIG. 3 is a simplified block diagrammatic illustration of the present invention arranged in a parallel manner.

As can be seen in FIG. 3, the parallel arranged system enables the agents to be expanded, e.g. multiple display agents can be added. Display Agent No. 1, 60a, Display Agent No. 2, 60b, and Display Agent No. 3, 60c, are all attached to the bus to allow parallel operation. One display unit can be at an off site location, for instance, a doctor's office, while another display units can be in other locations.

This flexibility in the arrangement of the present invention also allows the system to be upgraded with minimum redesign difficulties. For instance, a low cost scanner can have additional agents added to the system and the potential for a high performance scanner is possible with relatively little redesign in this section. The present invention also allows the system to recognize and by-pass a faulty agent in favor of a functional agent.

Figure 4A:
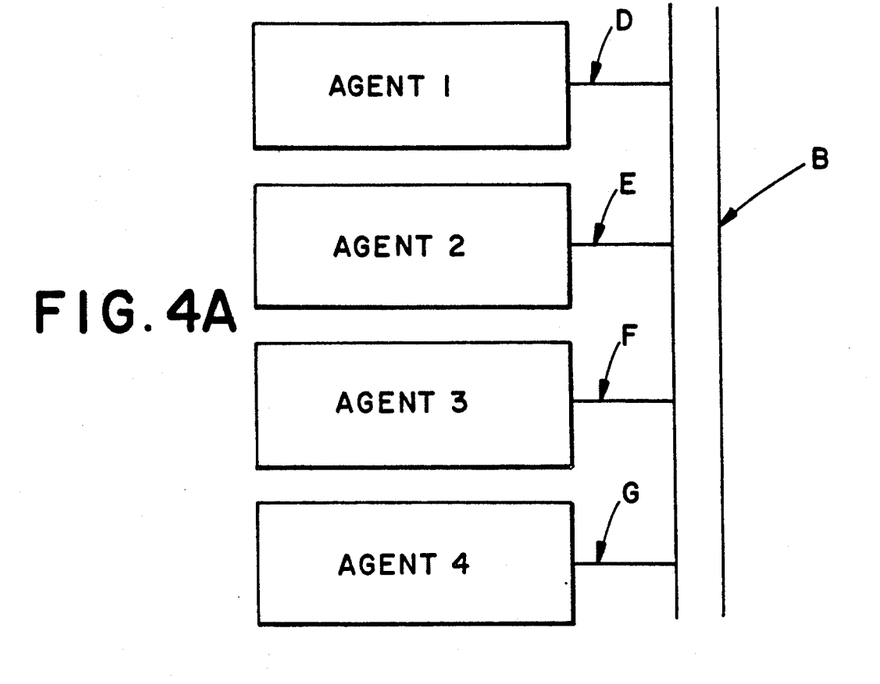
FIGS. 4A and 4B are alternate embodiments of the present invention as shown in FIG. 1.
Figure 4B:
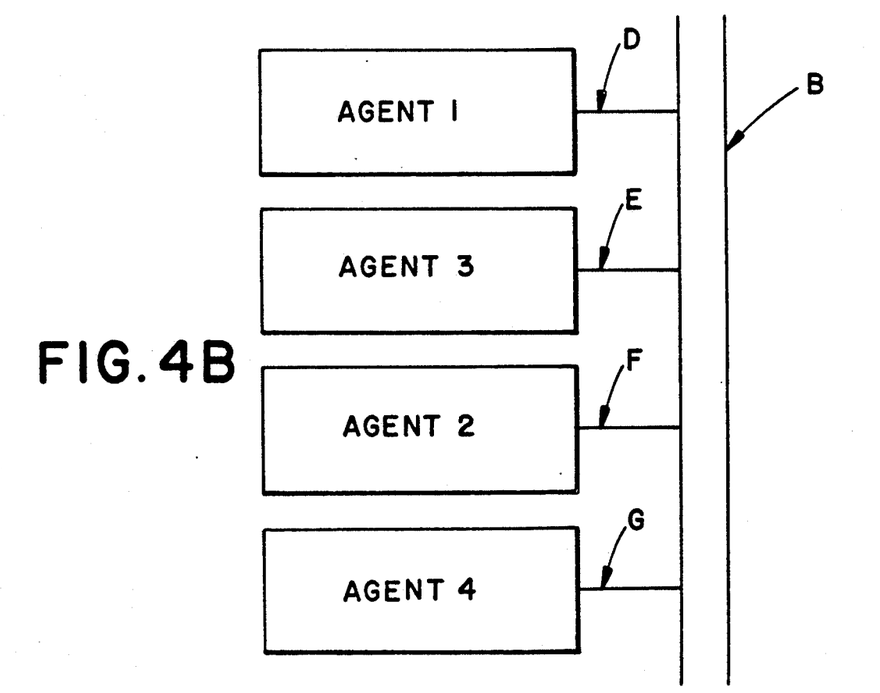

As illustrated in FIG. 4A, agents 1-4 may be interchanged and re-ordered independent of any particular slot insert D-G as shown, for example, in FIG. 4B. In the traditional global system communication, whether interrupts or data, is handled through wiring from one board to another. In order to pass an interrupt from one piece of circuitry to another, it is necessary to have a wire or connection either through the back plane or from board to board. In the present system, this is not necessary. All of the communication, including interrupts, is handled through messages sent on the data bus B. Therefore, the agents 1-4 are not tied to any one insert slot D-G.

The unrequested messages discussed in connection with FIG. 3 are basically "intelligent interrupts" because the messages contain significant amounts of various types of information. It is a message which is not expected, calls for action by the agent to which it is sent, and provides information as to the specific nature of that action. In a conventional computer architecture, these interrupts are hard wired and there is a limited defined finite number of interrupts capable in such a system. Additionally, they convey a limited amount of information. In the present invention, the interrupts are controlled exclusively by the software and there is no limit to the number of such messages.

With continuing reference to FIGS. 4A and 4B, the location of a specific agent is not required to be in a specific slot due to internal look-up tables individually produced by each of the agents 1-4, upon energization. When the system is energized, one of the agents 1-4 sends out inquiries interrogating the other agents as to function and location. A message is produced telling the inquiring agent the type of agent and its location. From these messages, this agent constructs a look-up table and sends that to each agent. When an agent wants to send a data packet, the board consults its internal table and pulls up a number which is an identification of the agent at a certain location. This allows the sending agent to put the proper location message with the proper data package.

The invention has been described with reference to the preferred embodiment. Obviously, modifications and alterations will occur to others upon reading and understanding the preceding detailed description of the preferred embodiment. It is intended that the invention be construed as including all such modifications and alterations insofar as they come within the scope of the appended claims or the equivalents thereof.

Having thus described the preferred embodiment, the invention is now claimed to be:

1. An imaging apparatus comprising:
   an image data generating means for conducting a non-invasive examination of a subject and generating image data;
   a parallel data bus for transferring packets of image data corresponding to a common image among a plurality of bus locations;
   a data acquisition agent for receiving the image data from the image data generating means, generating a data bus location of a subsequent agent, and transmitting data packets including the image data and the data bus location of the subsequent agent;
   a plurality of independently functioning image processing agents, including the subsequent agent, each of the plurality of agents dependent upon others of the plurality of agents for data packets, each interchangeably connected with one of the bus locations, each agent including self-contained memory means, each image processing agent (i) receiving the data packets which include the data bus location with which the receiving agent is associated, (ii) performing an image processing operation on the data packet, (iii) generating another location of another agent, and (iv) transmitting the processed data packets including the processed image data and the another bus location along the parallel data bus; and
   a display agent for receiving processed image data packets from one of the image processing agents via the parallel data bus, storing the processed image data packets, and communicating the processed image data to a man-readable image display of the common image wherein, the plurality of agents cooperatively function to reconstruct the common image.

2. The imaging apparatus as set forth in claim 1 further including interface means having direct memory access registers.

3. An imaging apparatus comprising:
   a data generating means for conducting a non-invasive examination of a subject and generating examination data;
   a parallel data bus for transferring packets of image data corresponding to a common image among a plurality of bus locations;
   a data acquisition agent for receiving image data from the data generating means, generating a bus location, and transmitting the bus location and packets of the examination data along the parallel data bus;
   a plurality of independently functioning image processing agents, each of the plurality of agents dependent upon others of the plurality of agents for data packets, each image processing agent being connected to a corresponding one of the bus locations, each agent receiving packets of data transmitted with the corresponding bus location, performing an image processing operation on the data packet, generating another bus location, and transmitting the another bus location and processed data packets along the parallel data bus;
   a display agent for receiving the processed image data packets from one of the image processing agents via the data bus, storing the processed data packets, and communicating the processed data to a man-readable image display means for converting the processed data packets into a man-readable image of the common image; and,
   interchanging means for interchanging the agents relationship to one another among the bus locations, the interchanging means including a backplane to which each of the agents are connected, connection to the backplane allowing routing of data directly from any one of the agents to any other one of the agents.

4. A computerized tomographic scanner comprising:

a source of penetrating radiation;

an array of detectors for detecting radiation that has traversed an image region;

a data acquisition agent which is a functionally independent computer having processing ability, a memory means and an input/output means, which acquisition agent receives data from the detector array, generates a preprocessing agent location message, and transmits packets of detector array data that include the preprocessing agent location message on a parallel bus;

a preprocessing agent which is a functionally independent computer having processing ability, a memory, means, and an input/output means, which processing agent receives from the parallel bus data packets that include the preprocessing agent location message, processes and stores the received data packets, generates a view processing agent location message, and transmits packets of preprocessed data that include the view processing agent location message on the parallel bus;

a view processing agent which is a functionally independent computer having processing ability, a memory, means, and an input/output means, which processing agent receives from the parallel bus data packets that include the view processing agent location message, convolves and stores the received data packets, generates a backprojector agent location message, and transmits packets of image data that include the backprojector location message on the parallel bus;

a backprojector agent which is a functionally independent computer having processing ability, a memory, means and an input/output means, which view processing agent receives from the parallel bus data packets that include the backprojector agent location message, backprojects and stores the received data, generates a display agent location message, and transmits packets of image data that includes the display agent location message on the parallel bus;

a display agent which is a functionally independent computer having processing ability, a memory, means and an input/output means, which receives from the parallel bus data packets that include the display agent location message, stores and communicates the data to a man-readable display means, generates an archiving agent location message and transmits packets of image data that includes the archiving agent location message on the parallel bus; and, an archiving agent which is a functionally independent computer having processing ability, a memory, and an input/output means, which receives from the bus data packets including the archiving agent location message and archives the data.

5. An image data processing apparatus comprising:

a parallel data bus for transferring packets of image data corresponding to a common image;

a plurality of independently functioning agents which process the packets of image data, each of the plurality of agents dependent upon others of the plurality of agents for data packets, each of the plurality of agents being associated to the parallel data bus such that a location of one of the agents in interchangeable with any other agent of the apparatus, each of the plurality of agents comprising:

a memory means for storing data inputted into the agent;

an interface for communication between the agent and the parallel data bus the interface including:

a first set of input/output means for inputting data not requested by the agent and outputting data not requested by another agent, the not requested data being stored in a buffer separated from the agent memory means, and a second set of input/output means for inputting data requested by the agent and outputting data requested by another agent, the second set of input/output means having direct access to the agent memory means; and, a microprocessing means for processing data inputted into the agent through the interface.

6. An image data processing method wherein a plurality of operationally varied image processing procedures function to reconstruct an image, the method comprising:

conducting a non-invasive examination of a subject;

generating image data corresponding to a common image from the non-evasive examination of the subject;

acquiring the generated image data, organizing the acquired data into data packets, and generating location messages to be included with each data packet;

transmitting each data packet along a parallel data bus, until the data packet reaches the location designated by the location message;

repeating the steps of organizing image data into data packets, generating location messages for the data packets, and transmitting the data packets on the parallel data bus, with a plurality of independently functioning image processing agents operatively associated with the parallel data bus, each of the plurality of agents dependent upon others of the plurality of agents for data packets for the plurality of varied image processing procedures; and, displaying processed image data packets received from the parallel data bus on a man-readable image display.

7. The image data processing method as set forth in claim 6 wherein the position of the agents in relationship to one another is interchangeable and the number of agents is variable.

8. The image data processing method as set forth in claim 6 wherein the agents operate concurrently.

9. The image data processing method as set forth in claim 6 wherein the data packets are portions of larger data blocks to be transferred.

10. The image data processing method as set forth in claim 9 wherein the data packets are such that data packets from one data block are interleaved on the bus with data packets from other data blocks.

11. The image data processing method as set forth in claim 10 wherein the data packets are transferred at a speed dependent on the speed of the bus.

12. The image data processing method as set forth in claim 6 wherein the apparatus is used in a computed tomographic scanning apparatus.

13. The image data processing method as set forth in claim 6 wherein the apparatus is used in a nuclear magnetic resonance imaging apparatus.

14. The image data processing method as set forth in claim 6 further including:

interfacing, through interfacing means, among the image processing procedures and the parallel data bus, wherein interrupts are accepted at the interfacing means; and storing the interrupts in a buffer of the image processing agent which accepts the interrupt, the buffer being separate from a memory area of the image processing agent.

15. A computerized tomographic scanning method comprising:

detecting radiation that has traversed an image region with an array of detectors;

acquiring data with a data acquisition agent indicative of radiation detected which traversed the image region;

generating data packets each including a preprocessing location;

transmitting the generated data packets corresponding to a common image with the preprocessing location onto a parallel bus;

receiving from the parallel bus the data packet having the preprocessed location;

generating a view processing location;

transmitting the packet of data with the view processing location onto the parallel bus;

receiving from the parallel bus the data packet having the view processing location;

generating a back projector location;

transmitting the packet of data with the backprojector location onto the parallel bus;

receiving from the parallel bus, the data packet having the backprojector location message;

generating at least a display location;

transmitting the packet of data with the display location onto the parallel bus;

receiving from the parallel bus the data packet having the display location;

generating an archiving location;

transmitting the generated packet of data with the archiving location onto the parallel bus;

receiving from the parallel bus the data packet having the archiving location wherein, the plurality of generating, transmitting and receiving steps are achieved by a plurality of independently functioning image processing agents operatively associated with the parallel bus;

generating a message by any of the plurality of image processing agents which is not requested by any other of image processing agents;

transmitting the not requested message with a selected location onto the parallel bus;

receiving from the parallel bus the not requested message by the image processing agent located at the selected location; and, storing the not requested message in a buffer of the selected image processing agent, the buffer being separated from a memory associate with the selected image processing agent.

16. The method as set forth in claim 15 wherein the positions of the plurality of agents are interchangeable in relationship to each other and the number of agents in the apparatus is variable.

17. The method as set forth in claim 15 wherein the transmitting of data packets onto the bus occur in an interleaved manner.

18. The method as set forth in claim 15 wherein the data packets are transmitted at a speed in accordance with the speed of the data bus.

* * * * *